(No Model.)

A. REDMANN.
CORNED BEEF TRAY AND MEAT RACK.

No. 426,958. Patented Apr. 29, 1890.

Witnesses
J. Vogel
Anton Fongner

Inventor
Adolf Redmann
By his Attorney Wm Zimmerman

UNITED STATES PATENT OFFICE.

ADOLPF REDMANN, OF CHICAGO, ILLINOIS.

CORNED-BEEF TRAY AND MEAT-RACK.

SPECIFICATION forming part of Letters Patent No. 426,958, dated April 29, 1890.

Application filed February 1, 1890. Serial No. 338,917. (No model.)

*To all whom it may concern:*

Be it known that I, ADOLPF REDMANN, a citizen of Germany, residing at Chicago, in the county of Cook and State of Illinois, have invented certain new and useful Improvements in Corned-Beef Trays and Meat-Racks, which are fully set forth in the following specification, reference being had to the accompanying drawings, forming a part hereof, and in which—

Figure 1:
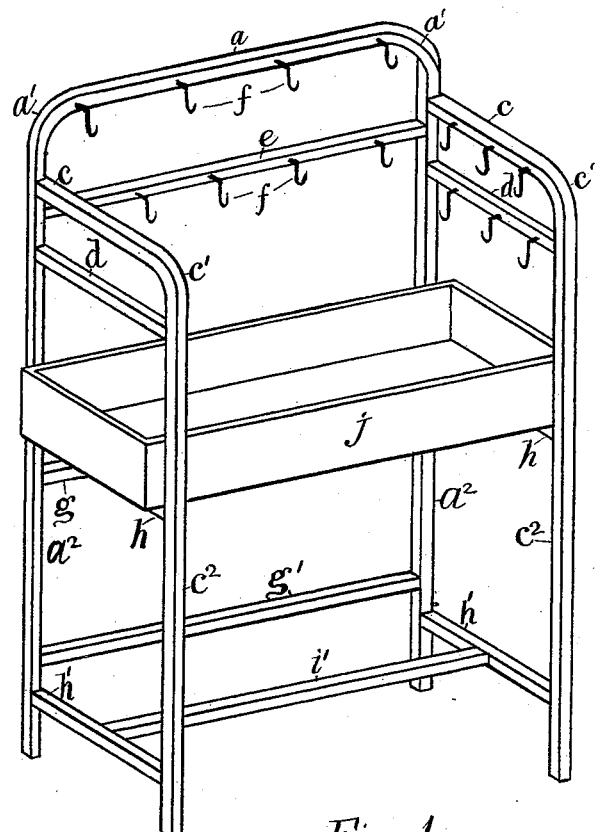
Figure 2:
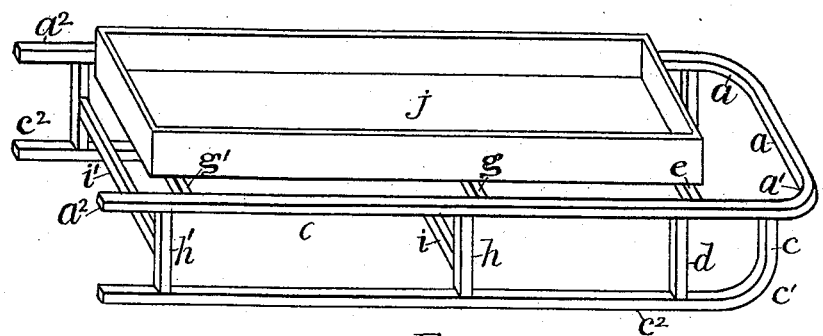

Figure 1 shows in perspective my new device in use as a corned-beef rack and meat-hanger. Fig. 2 shows the same when used as a sled and supporter and hand-barrow.

The object of my invention is to provide a device specially adapted to support and hang dripping or wet meats—such as corned beef—and to both preserve such juices from being wasted and from slopping and soiling the floor, and also to provide in the construction of the same device means for transporting and holding such meat in a convenient manner in and about meat establishments, and to attain said ends I construct my new device in substantially the following manner, namely:

I make a rigid frame for a back or top part, consisting of the upper bar $a$ and side bars $a^2$, connected to said bar $a$ by means of round corners $a'$, all formed out of one piece of wood, or strengthened, if formed of several pieces, so as to be as rigid as if made of one piece. Just below the said corners is a transverse bar $e$, and below said bar $e$, near the middle of the sides $a^2$, is another cross-bar $g$, and below this said bar and near the ends of the sides $a^2$ is a second bar $g'$, each forming a rigid part of the structure, which may be called the "back" or "top." Below said curves $a'$ are parallel bars $c$, connected by round corners $c'$ to bars $c^2$, which latter are parallel to the bars $a^2$, and below the said bars $c$ and parallel with them and below the bar $e$ and below the said curves $c'$ are parallel bars $d$, connecting the bars $a^2$ and $c^2$, and about midway between the ends of the bars $c^2$ are bars $h$, and near the lower ends of said bars are bars $h'$, each parallel to the bars above and to like bars on the opposite side of them, as shown. The bars $h$ and $h'$ are connected together by parallel bars $i$, secured midway between the ends of said bars $h$ and $h'$. The latter cross-bars are for the purpose of holding the sides of the device parallel and rigidly to the back or top. Upon said bars $h$ is placed a trough or water-tight box J, which may project slightly beyond the sides, as shown, and of which the sides lay closely against the posts $a^2 c^2$. Upon the interior sides of the bars $a c d e$ are attached meat-hooks $f$, which project inward far enough to support the meat hung on them over the tray J, so as to cause all liquids dripping from such meat to fall into said tray, and at the same time meats that are to be kept in their liquor or pickle can be kept in said tray exposed for sale, and are at the same time easily seen and got at.

When it is desired to transport the meats from place to place, my said device is turned down so as to stand on the bars or legs $c^2$, which now, with their round corners $c'$, become sled-runners, as seen in Fig. 2, and the tray J is then loaded upon the back or top of the sled with its meats, and may then be run and used as a sled or serve as a hand-barrow to carry the meats from place to place.

What I claim is—

1. In a corned-beef tray, the posts $a^2 c^2$, connected by the bars $a c d e$ at their upper ends, and provided on their interior sides with hooks $f$, and said posts further provided with bars $h h'$, connected by central bars $i i'$ and bars $g' g$, in combination with a tray J, passing between the posts $a^2 c^2$, and extending between the sides of the rack, substantially as specified.

2. In a corned-beef tray, the posts $a^2 c^2$, connected by the bars $a c d e$, said posts $a^2$ and bar $a$ connected by the round corners $a'$, and said posts $a^2 c^2$ and bars $c$ connected each by a single round corner $c'$, and said posts $a^2 c^2$ further provided with bars $h h'$, connected by central bars $i i'$, and the posts $a^2 c^2$ further connected by bars $g g'$, and said bars $a c d e$ provided on their interior sides with meat-hooks $f$, in combination with a tray J, for the use substantially as specified.

ADOLPF REDMANN.

Witnesses:
WM. ZIMMERMAN,
T. E. VOGEL.